US007741577B2

(12) United States Patent
Kong et al.

(10) Patent No.: US 7,741,577 B2
(45) Date of Patent: Jun. 22, 2010

(54) MODULAR HYBRID PLASMA REACTOR AND RELATED SYSTEMS AND METHODS

(75) Inventors: Peter C. Kong, Idaho Falls, ID (US); Jon D. Grandy, Idaho Falls, ID (US); Brent A. Detering, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 250 days.

(21) Appl. No.: 11/392,141

(22) Filed: Mar. 28, 2006

(65) Prior Publication Data

US 2007/0235419 A1 Oct. 11, 2007

(51) Int. Cl.
*B23K 10/00* (2006.01)

(52) U.S. Cl. ............................ 219/121.36; 219/121.52; 219/121.59

(58) Field of Classification Search ............ 219/121.36, 219/121.43, 121.44, 121.48, 121.49, 121.5, 219/121.51, 121.52, 121.59, 121.123; 313/156, 313/231.41

See application file for complete search history.

(56) References Cited

U.S. PATENT DOCUMENTS

| | | | | |
|---|---|---|---|---|
| 3,309,550 | A * | 3/1967 | Kemeny et al. | 219/123 |
| 3,309,873 | A * | 3/1967 | Cann | 60/203.1 |
| 3,403,211 | A * | 9/1968 | Foex | 373/20 |
| 3,998,619 | A | 12/1976 | Cerutti et al. | |
| 4,013,867 | A | 3/1977 | Fey | |
| 4,087,322 | A | 5/1978 | Marcus | |
| 4,219,726 | A * | 8/1980 | Meyer et al. | 219/383 |
| 4,282,393 | A | 8/1981 | Williamson | |
| 4,429,612 | A * | 2/1984 | Tidman et al. | 89/8 |
| 4,818,836 | A | 4/1989 | Bebber et al. | |
| 4,842,683 | A | 6/1989 | Cheng et al. | |
| 5,132,597 | A | 7/1992 | Goebel et al. | |
| 5,215,619 | A | 6/1993 | Cheng et al. | |

(Continued)

FOREIGN PATENT DOCUMENTS

GB 1 248 595 10/1971

(Continued)

OTHER PUBLICATIONS

"3-Phase 100 kW AC Plasma," Centre d'Energetique, May 14, 2003, 3 pages.

(Continued)

*Primary Examiner*—Stephen J Ralis
(74) *Attorney, Agent, or Firm*—TraskBritt

(57) ABSTRACT

A device, method and system for generating a plasma is disclosed wherein an electrical arc is established and the movement of the electrical arc is selectively controlled. In one example, modular units are coupled to one another to collectively define a chamber. Each modular unit may include an electrode and a cathode spaced apart and configured to generate an arc therebetween. A device, such as a magnetic or electromagnetic device, may be used to selectively control the movement of the arc about a longitudinal axis of the chamber. The arcs of individual modules may be individually controlled so as to exhibit similar or dissimilar motions about the longitudinal axis of the chamber. In another embodiment, an inlet structure may be used to selectively define the flow path of matter introduced into the chamber such that it travels in a substantially circular or helical path within the chamber.

40 Claims, 5 Drawing Sheets

U.S. PATENT DOCUMENTS

| | | | |
|---|---|---|---|
| 5,312,471 | A | 5/1994 | Jung |
| 5,346,579 | A | 9/1994 | Cook et al. |
| 5,440,206 | A | 8/1995 | Kurono et al. |
| 5,451,738 | A | 9/1995 | Alvi et al. |
| 5,674,321 | A | 10/1997 | Pu et al. |
| 5,688,417 | A | 11/1997 | Cadre et al. |
| 5,707,692 | A | 1/1998 | Suzuki |
| 5,801,489 | A | 9/1998 | Chism, Jr. et al. |
| 5,896,012 | A | 4/1999 | Munemasa et al. |
| 5,935,293 | A | 8/1999 | Detering et al. |
| 5,935,455 | A | 8/1999 | Glejbol |
| 5,980,687 | A | 11/1999 | Koshimizu |
| 6,113,731 | A | 9/2000 | Shan et al. |
| 6,127,645 | A | 10/2000 | Titus et al. |
| 6,163,006 | A | 12/2000 | Doughty et al. |
| 6,164,240 | A | 12/2000 | Nikulin |
| 6,372,156 | B1 | 4/2002 | Kong et al. |
| 6,382,129 | B1 | 5/2002 | Nikulin |
| 6,407,382 | B1 | 6/2002 | Spangler |
| RE37,853 | E | 9/2002 | Detering et al. |
| 6,549,557 | B1 | 4/2003 | Bowman |
| 2002/0093294 | A1 | 7/2002 | Czernichowski et al. |
| 2005/0115933 | A1 | 6/2005 | Kong et al. |

FOREIGN PATENT DOCUMENTS

| | | |
|---|---|---|
| WO | WO 01/58625 A1 | 8/2001 |

OTHER PUBLICATIONS

Trivedi et al., "Characterization of a Gas-Stabilized ARc Plasma in an ExB Magnetic Field Configuration," Applied Spectroscopy, vol. 42, No. 6, 1988, pp. 1025-1032.

International Preliminary Report on Patentability and Written Opinion of the International Searching Authority,dated Sep. 30, 2008, International Application No. PCT/US2007/064467, International Filing Date Mar. 21, 2007.

* cited by examiner

MODULAR HYBRID PLASMA REACTOR AND RELATED SYSTEMS AND METHODS

STATEMENT OF GOVERNMENT RIGHTS

This invention was made with government support under Contract No. DE-AC07-051D14517 awarded by the United States Department of Energy. The government has certain rights in this invention.

BACKGROUND OF THE INVENTION

1. Field of the Invention

The present invention relates generally to plasma arc reactors and systems and, more particularly, to a modular plasma arc reactor and system as well as related methods of creating a plasma arc.

2. State of the Art

Plasma is generally defined as a collection of charged particles containing about equal numbers of positive ions and electrons and exhibiting some properties of a gas but differing from a gas in being a good conductor of electricity and in being affected by a magnetic field. A plasma may be generated, for example, by passing a gas through an electric arc. The electric arc will rapidly heat the gas by resistive and radiative heating to very high temperatures within microseconds of the gas passing through the arc. Essentially any gas may be used to produce a plasma in such a manner. Thus, inert or neutral gasses (e.g., argon, helium, neon or nitrogen) may be used, reductive gasses (e.g., hydrogen, methane, ammonia or carbon monoxide) may be used, or oxidative gasses (e.g., oxygen, water vapor, chlorine, or carbon dioxide) may be used depending on the process in which the plasma is to be utilized.

Plasma generators, including those used in conjunction with, for example, plasma torches, plasma jets and plasma arc reactors, generally create an electric discharge in a working gas to create the plasma. Plasma generators have been formed as direct current (DC) generators, alternating current (AC) plasma generators, as radio frequency (RF) plasma generators and as microwave (MW) plasma generators. Plasmas generated with RF or MW sources may be referred to as inductively coupled plasmas. In one example of an RF-type plasma generator, the generator includes an RF source and an induction coil surrounding a working gas. The RF signal sent from the source to the induction coil results in the ionization of the working gas by induction coupling to produce a plasma. In contrast, DC- and AC-type generators may include two or more electrodes (e.g., an anode and cathode) with a voltage differential defined therebetween. An arc may be formed between the electrodes to heat and ionize the surrounding gas such that the gas obtains a plasma state. The resulting plasma, regardless of how it was produced, may then be used for a specified process application.

For example, plasma jets may be used for the precise cutting or shaping of a component; plasma torches may be used in forming a material coating on a substrate or other component; and plasma reactors may be used for the high-temperature heating of material compounds to accommodate the chemical or material processing thereof. Such chemical and material processing may include the reduction and decomposition of hazardous materials. In other applications plasma reactors have been utilized to assist in the extraction of a desired material, such as a metal or metal alloy, from a compound which contains the desired material.

Exemplary processes which utilize plasma-type reactors are disclosed in U.S. Pat. Nos. 5,935,293 and RE37,853, both issued to Detering et al. and assigned to the assignee of the present invention, the disclosures of which are incorporated by reference herein in their entireties. The processes set forth in the Detering patents include the heating of one or more reactants by means of, for example, a plasma torch to form from the reactants a thermodynamically stable high temperature stream containing a desired end product. The gaseous stream is rapidly quenched, such as by expansion of the gas, in order to obtain the desired end products without experiencing back reactions within the gaseous stream. In one embodiment, the desired end product may include acetylene and the reactants may include methane and hydrogen. In another embodiment, the desired end product may include a metal, metal oxide or metal alloy and the reactant may include a specified metallic compound. However, as recognized by the Detering patents, gases and liquids are the preferred forms of reactants since solids tend to vaporize too slowly for chemical reactions to occur in the rapidly flowing plasma gas before the gas cools. If solids are used in plasma chemical processes, such solids ideally have high vapor pressures at relatively low temperatures. These type of solids, however, are severely limited. Of course, such processes are merely examples and numerous other types of processes may be carried out using plasma technologies.

As noted above, process applications utilizing plasma generators are often specialized and, therefore, the associated plasma jets, torches and/or reactors need to be designed and configured according to highly specific criteria. Such specialized designs often result in a device that is limited in its usefulness. In other words, a plasma generator that is configured to process a specific type of material using a specified working gas to form the plasma is not necessarily suitable for use in other processes wherein a different working gas may be required, wherein the plasma is required to exhibit a substantially different temperature or wherein a larger or smaller volume of plasma is desired to be produced.

In view of the shortcomings in the art, it would be advantageous to provide a plasma generator and associated system that provides improved flexibility regarding the types of applications in which the plasma generator may be utilized. For example, it would be advantageous to provide a plasma generator and associated system that produces an improved arc and associated plasma column or volume wherein the arc and plasma volume may be easily adjusted and defined so as to provide a plasma with optimized characteristics and parameters according to an intended process for which the plasma is being generated.

BRIEF SUMMARY OF THE INVENTION

In accordance with one aspect of the invention an apparatus for generating a plasma is provided. The apparatus includes a chamber having an inlet and an outlet. A first electrode pair, comprising an anode and a cathode, is configured to provide a first electrical arc proximate the inlet of the chamber. A second electrode pair, also comprising an anode and a cathode, is configured to provide a second electrical arc within the chamber such that the second electrical arc extends between an arc endpoint on the cathode and an arc endpoint on the anode. A device is configured to selectively move a circumferential location of at least a portion of the second electrical arc within the chamber relative to a longitudinal axis of the chamber. In one embodiment, the device may include one or more electrical coils configured to generate a selectively controlled magnetic field so as to induce movement in the second electrical arc.

In accordance with another aspect of the present invention, another plasma generating apparatus is provided. The apparatus includes a plurality of interconnected modules cooperatively defining a chamber. Each module of the plurality of interconnected modules includes at least one device configured to generate an electrical arc within the chamber, and at least one device configured to generate a magnetic field within the chamber, the magnetic field being configured to selectively displace (e.g., rotate) at least a portion of the electrical arc within the chamber.

In accordance with a further aspect of the present invention, a method of generating a plasma is provided. The method includes providing an anode and a cathode, the cathode being positioned proximate the anode, and introducing matter to a region between the anode and the cathode. A voltage is applied between the first electrode and the second electrode and an electrical arc is established that extends between an arc endpoint on the anode and an arc endpoint on the cathode. At least one magnetic field is generated in at least one region through which at least a portion of the electrical arc passes the at least one magnetic field is selectively controlled so as to selectively move a circumferential location of at least one of the arc endpoint on the anode and the arc endpoint on the cathode about a longitudinal axis of the chamber.

In accordance with yet another aspect of the present invention, another method is provided of generating a plasma. The method includes providing a chamber comprising a plurality of interconnected modules to collectively define a chamber. Each module includes an electrode pair, including a cathode and an anode, and each module further includes at least one device configured to generate at least one selectively controllable magnetic field in at least one region through which the associated module's electrical arc is intended to pass through. A voltage is applied between the anode and the cathode of the electrode pair of each module so as to establish an electrical arc between an arc endpoint on a surface of its associated cathode and an arc endpoint on a surface of its associated anode. The at least one magnetic field of each module is selectively controlled so as to selectively move the circumferential location of at least one of the arc endpoint on the surface of the associated cathode and the arc endpoint on the surface of the associated anode.

BRIEF DESCRIPTION OF THE SEVERAL VIEWS OF THE DRAWINGS

While the specification concludes with claims particularly pointing out and distinctly claiming that which is regarded as the present invention, various advantages of the invention may be more readily ascertained from the following description of the various embodiments of the invention when read in conjunction with the accompanying drawings in which:

DETAILED DESCRIPTION OF THE INVENTION

The illustrations presented herein are not meant to be actual views of any particular plasma generating apparatus or device but are merely idealized representations, which are employed to describe various embodiments of the present invention. It is noted that elements which are common between figures may retain the same numerical designation.

The term "module," as used herein, means any structure that is configured to be attached to another structure to provide an apparatus including the two structures, the function, capability or method of operation of the apparatus being easily modified by adding, removing, or changing the structures.

Figure 1:
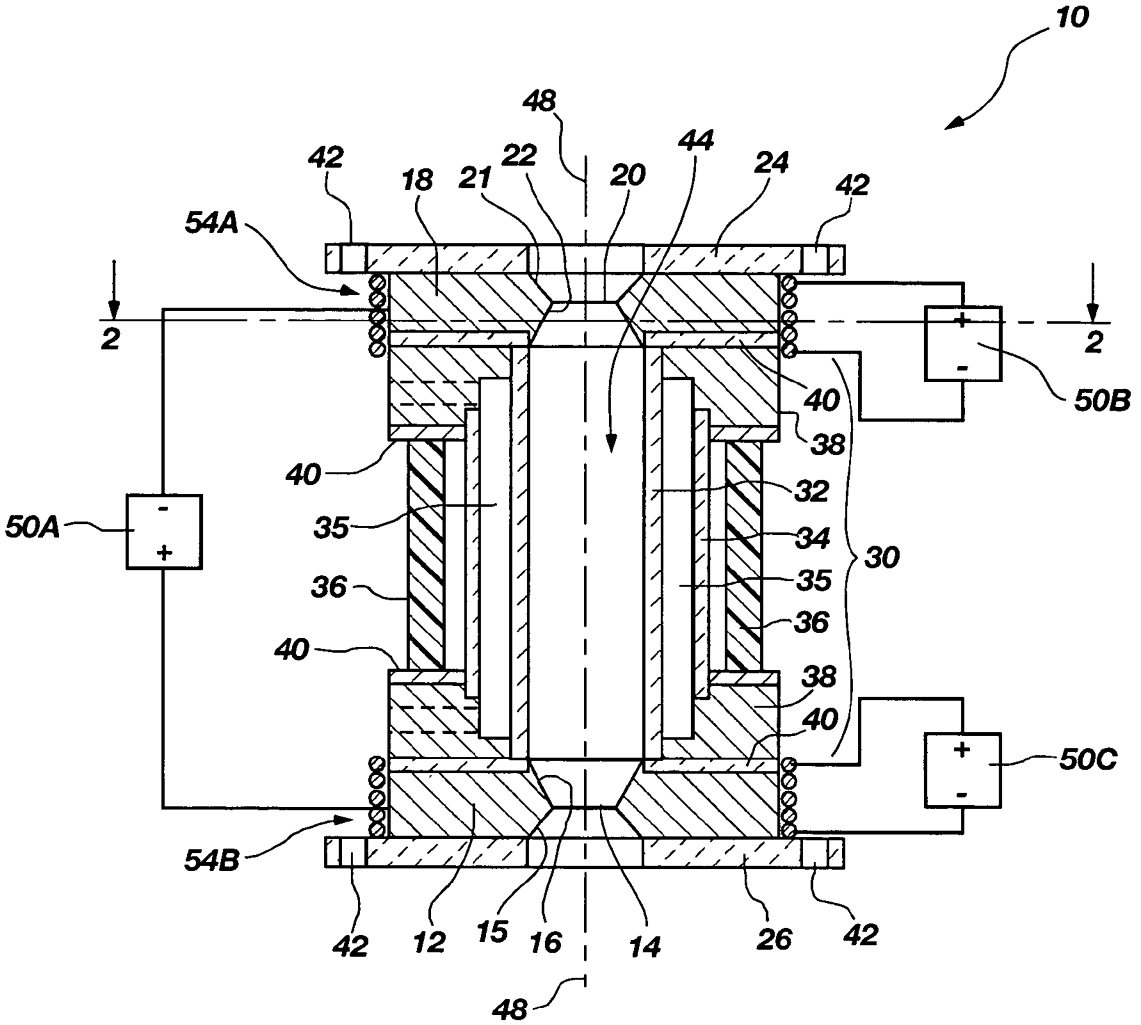
FIG. 1 is a cross-sectional view of a module that may be used as part of a plasma generating apparatus in accordance with an embodiment of the present invention.

Referring to FIG. 1, a module 10 that may be used as a plasma generating apparatus (or as a component part of a plasma generating apparatus) is shown in accordance with one embodiment of the presently disclosed invention. The module 10 includes an electrode pair comprising an anode 12 and a cathode 18. The electrode pair is configured to provide an electrical arc between the anode 12 and the cathode 18 as discussed in further detail below. The module 10 may also include a first endplate 24, a second endplate 26, and an arc-enclosing structure 30.

The arc-enclosing structure 30 may be configured to at least partially enclose a defined volume through which an electrical arc extending between the anode 12 and the cathode 18 passes. The arc-enclosing structure 30 may include, for example, a first cylindrical tube 32, a second cylindrical tube 34 having a diameter larger than a diameter of the first cylindrical tube 32, at least two rods or posts 36, two connecting disks 38, and compression plates 40. The first cylindrical tube 32, the second cylindrical tube 34, and the posts 36 may all be secured and connected to the connecting disks 38. It is noted that all of such described components are not necessary to the function of the module 10, and that some of the components may be integrally formed. For example, the compression plates 40 may be eliminated or otherwise integrated into other components. Additionally, the module 10 may include other components not specifically shown. For example, O-rings or other seal members may be disposed between various interfacing surfaces of the individual components. In a more specific example, O-rings or other seal members may be disposed at a location adjacent the inner diameter of the compression plates 40 at the location where they abut the first cylindrical tube 32 or at other similar interfacing locations.

The first cylindrical tube 32 and the second cylindrical tube 34 may each comprise an electrically insulating refractory material such as, for example, quartz. The first cylindrical tube 32 may be positioned within the second cylindrical tube 34 so as to define a generally annular space 35 therebetween. A fluid passageway 39 may be defined in each of the connecting disks 38 and be arranged in communication with the annular space 35. One fluid passageway 39 may be configured as a fluid inlet and one fluid passageway 39 may be configured as a fluid outlet to the annular space 35. A fluid (not shown), such as water or some other coolant, may be circulated through one fluid passageway 39, through the annular space 35, and out of the second fluid passageway 39 so as to transfer heat from the arc-enclosing structure including the first cylindrical tube 32.

The posts 36 may be used to provide added structural support to the arc-enclosing structure 30. The posts 36 may be formed from, for example, a polymer material such as a phenolic material. While not shown, rods or other structural components may be used to couple the various components together. For example, a threaded rod may extend between the first and second end plates 24 and 26 and through appropriately sized and located openings 42 formed therein. Thus, in one embodiment, such rods may be used to compress the first and second endplates 24 and 26 toward one another to hold the other components of the module 10 in their desired positions. In other embodiments, the openings 42 may be used to couple the module 10 with other modules or other associated components.

Still referring to FIG. 1, the anode 12 and the cathode 18 each may have a substantially annular shape, and together with the arc-enclosing structure 30 may define a substantially cylindrical aperture or bore 44 extending through the module 10 and centered about a longitudinal axis 48. As used herein, the term "substantially annular" means of, relating to, or forming any three-dimensional structure having an interior void or aperture extending through the structure from a first side of the structure to a second side of the structure. The interior void or aperture may be of any shape including, but not limited to, circular, oval, triangular, rectangular, etc., and may have a complex curved shape. By way of example and not limitation, substantially annular shapes include any prismatic shape (polyhedrons with two polygonal faces lying in parallel planes and with the other faces parallelograms) in which an interior void or aperture extends between two polygonal faces of the prismatic shape that are disposed in parallel planes, such as, for example, hollow cylindrical shapes.

The first endplate 24 and the second endplate 26 each may also have an interior void or aperture extending therethrough.

The anode 12 and the cathode 18 are configured to provide an electrical arc that extends through the bore 44 from an electrical arc endpoint on the anode 12 to an electrical arc endpoint on the cathode 18. By way of example and not limitation, the anode 12 may include a substantially circular edge 14 defined by the intersection between a first surface 15 and a second surface 16 of the anode 12 such that the circular edge 14 is the radially innermost surface of the anode 12. Similarly, the cathode 18 may include a substantially circular edge 20 defined by the intersection between a first surface 21 and a second surface 22 of the cathode 18. The arc endpoint on the anode 12 may be located on the circular edge 14, and the arc endpoint on the cathode 18 may be located on the circular edge 20. Of course other configurations of the anode 12 and cathode 18 may be used as will be appreciated by those of ordinary skill in the art.

An electrical power source 50A may be provided and configured to apply a voltage between the anode 12 and the cathode 18. If the magnitude of the voltage between the anode 12 and the cathode 18 reaches a critical point, an electrical arc (not shown) may be generated and caused to extend between the anode 12 and the cathode 18. The magnitude of this critical-point voltage may be reduced by providing charged ions within the bore 44 between the anode 12 and the cathode 18 thereby reducing the resistivity between the anode 12 and cathode 18. In this manner, the anode 12, the cathode 18, and the electrical power source 50A provide a device configured to generate an electrical arc within the module 10. By way of example and not limitation, the power source may include a direct current (DC) power source configured to provide a voltage in a range extending from about 70 volts to about 80 volts and a current in a range from about 90 amps to about 110 amps between the anode 12 and the cathode 18.

The module 10 may also include at least one device configured to generate a magnetic field in a desired region within the module 10. The magnetic field may be selectively controlled to move the location of at least a portion of an electrical arc within the module 10. For example, the module 10 may include an electrically conductive wire wound in a coil 54A. The coil 54A may surround at least a portion of the module 10. In one particular embodiment, the coil 54A may surround at least a portion of the module 10 proximate the cathode 18. The module 10 may include an additional electrically conductive wire wound in a coil 54B that surrounds a portion of the module 10 such as, for example, at a location proximate the anode 12. An electrical power source 50B may be provided and configured to pass electrical current through the electrically conductive wire of the coil 54A, and an electrical power source 50C may be provided and configured to pass electrical current through the electrically conductive wire of the coil 54B. In another embodiment, a single electrical power source could be provided and configured to pass electrical current through both coils 54A and 54B.

As an electrical current is passed through the coils 54A and 54B, a magnetic field of a desired strength may be generated in a desired region within the module 10 depending on the configuration of the coils and the strength of current flowing therethrough. In one example, a magnetic field may be generated in a region located within the module 10 between the arc endpoint on the anode 12 and the arc endpoint on the cathode 18. The magnetic field produced by such coils may be used advantageously to influence one or more characteristics of the generated arc as will be discussed in greater detail hereinbelow.

An electrical arc comprises a flow of electrons, each electron having a negative charge by definition. When an electrical arc is generated in the module 10, the negatively charged electrons may travel through the bore 44 from the cathode 18 to the anode 12 (e.g., from the arc end point of the cathode 18 to the arc endpoint of the anode 12).

Figure 2A:
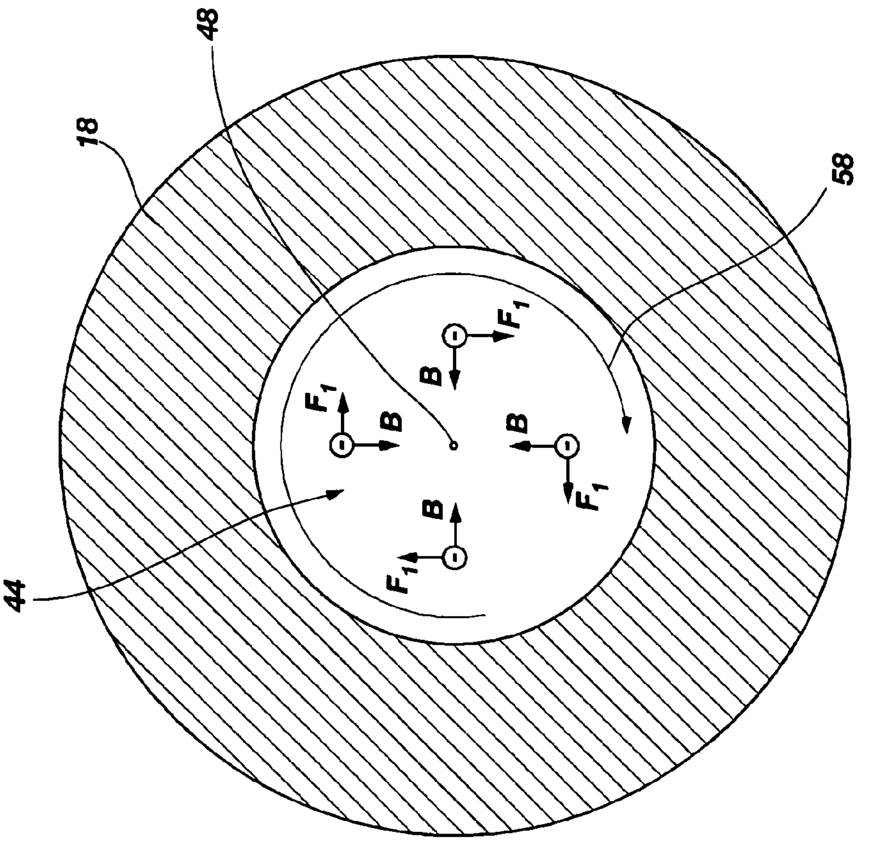
FIGS. 2A and 2B are cross-sectional views of a portion of the module shown in FIG. 1, taken along section line 2-2 therein, which are used in illustrating certain principles of operation of the module.

FIG. 2A is a cross-sectional view of the cathode 18 as taken along section line 2-2 of FIG. 1. Referring to FIG. 2A in conjunction with FIG. 1, four electrons (represented by circles with a "−", or a negative charge) are illustrated at various positions within the bore 44 of the module 10 proximate the cathode 18. When electrical current is passed through the electrically conductive wire of the coil 54A proximate the cathode 18 in the counter-clockwise direction (i.e., when looking through the bore 44 from the first endplate 24 toward the second endplate 26), a magnetic field may be generated in the bore 44. At least a component of the magnetic field within the bore 44 in the plane of FIG. 2A may be directed inwardly toward the longitudinal axis 48 as represented by the magnetic field vectors B. If the electrons are moving through the bore 44 in a direction extending from the first endplate 24 to the second endplate, the current velocity vector of each electron extends vertically into the plane of FIG. 2A. According to the Lorentz force law, $F=qV \times B$, where q is the charge on a moving particle, V is the velocity vector of the moving particle, B is the magnetic field vector through which the particle is moving, and F is the force vector representing the force acting on the moving particle. Thus, according to the Lorentz force law, the negatively charged electrons flowing in the defined direction through the defined magnetic field may experience a force in the directions represented by the force vectors $F_1$ shown in FIG. 2A.

The forces $F_1$ may cause at least a portion of the electrical arc extending between the anode 12 and the cathode 18 to move in a substantially clockwise circular motion within the bore of the module as represented by the directional arrow 58. For example, these forces may cause the circumferential location of the arc endpoint to move along the edge 20 of the cathode 18 in a substantially clockwise circular motion within the bore 44 of the module 10.

Positively charged ions flowing in the same direction as the electrons through the magnetic field may experience a force in an opposite direction to those represented by the force vectors $F_1$ in FIG. 2A. As a result, such positive ions may move in a substantially opposite direction within the bore 44 relative to the negatively charged electrons thereby providing a potentially turbulent mixing effect within the bore 44 of the module 10.

Figure 2B:
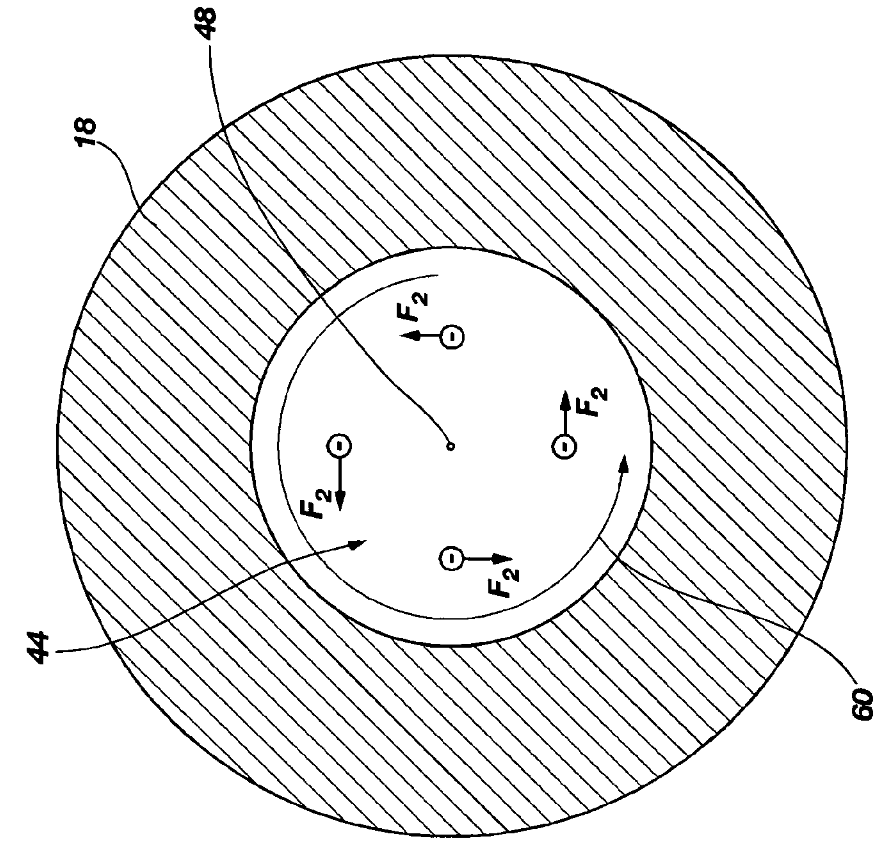

Referring now to FIG. 2B in conjunction with FIG. 1, the electrons are shown as being subjected to oppositely directed forces represented by the force vectors $F_2$ within the bore 44. This may occur as a result of at least two different factors or inputs. First, the direction of current flow provided by the electrical power source 50B through the coil 54A proximate the cathode 18 may be reversed such that current flows through the coil 54A in a clockwise direction (when looking through the bore 44 from the first endplate 24 toward the second endplate 26). Reversing the direction of current flow through the coil 54 also reverses the direction of the magnetic field vectors B (compared to that which is shown in FIG. 2A), such that the magnetic field vectors B extend in a radial direction outwardly from the longitudinal axis 48 toward the cathode 18. Reversing the direction of the magnetic field vectors B results in the direction of the forces being reversed (assuming all other variables remain constant), as predicted by the Lorentz force law.

Secondly, the electrons may be subjected to oppositely directed forces, such as is represented by the vectors $F_2$ shown in FIG. 2B, by reversing the polarity of the power source 50A connected between the anode 12 and the cathode 18 (which essentially reverses the positions of the anode 12 and the cathode 18 within the module 10). Since electrons flow from the cathode 18 to the anode 12, reversing the polarity of the power source 50 causes the direction of the flowing electrons within the electrical arc to change such that the electrons are flowing vertically out from the plane of FIGS. 2A and 2B. In other words, reversing the polarity of the electrical power source 50A may reverse the direction of the velocity vector V in the Lorentz force law. Reversing the velocity vector, such that the velocity vector of each electron extends vertically out from the plane of FIG. 2B (or generally in the direction extending from the second end plate 26 to the first end plate 24), will also reverse the direction of the forces (assuming all other variables remain constant) as compared to those depicted in FIG. 2A, as predicted by the Lorentz force law.

The forces $F_2$ depicted in FIG. 2A may cause at least a portion of the electrical arc extending between the anode 12 and the cathode 18 to move in a substantially counter-clockwise circular motion within the bore 44 of the module 10 as represented by the directional arrow 60. For example, these forces may cause the circumferential location of the arc endpoint to move along the edge 20 of the cathode 18 in a substantially counter-clockwise circular motion within the bore 44 of the module 10.

Additional magnetic fields may be provided within the module 10 proximate the anode 12 using the coil 54B and the electrical power source 50C in a substantially similar manner to that previously described in relation to the electrically conductive wire 54A and the electrical power source 50B. By selectively controlling the magnetic fields within the module 10 produced by the electrically conductive coils 54A and 54B, the circumferential location of the arc endpoint on the anode 12 and the circumferential location of the arc endpoint on the cathode 18 may be made to move concurrently in the same circular direction about the axis 48 within the module 10. In another embodiment, the circumferential location of the arc endpoint on the anode 12 and the circumferential location of the arc endpoint on the cathode 18 may be made to move in opposite circular directions about the axis 48 by selectively controlling the magnetic fields within the module 10.

Using the principles discussed in the preceding paragraphs, the voltage between the anode 12 and the cathode 18, the current passing through the coil 54B proximate the anode 12, and the current passing through the coil 54A proximate the cathode 18 may each be selectively controlled to selectively manipulate the location and movements of the electrical arc extending between the anode 12 and the cathode 18.

In accordance with one aspect of the present invention, a plasma generating apparatus may include one or more modules such as, for example, the module 10 shown and described with respect to FIG. 1.

Figure 3:
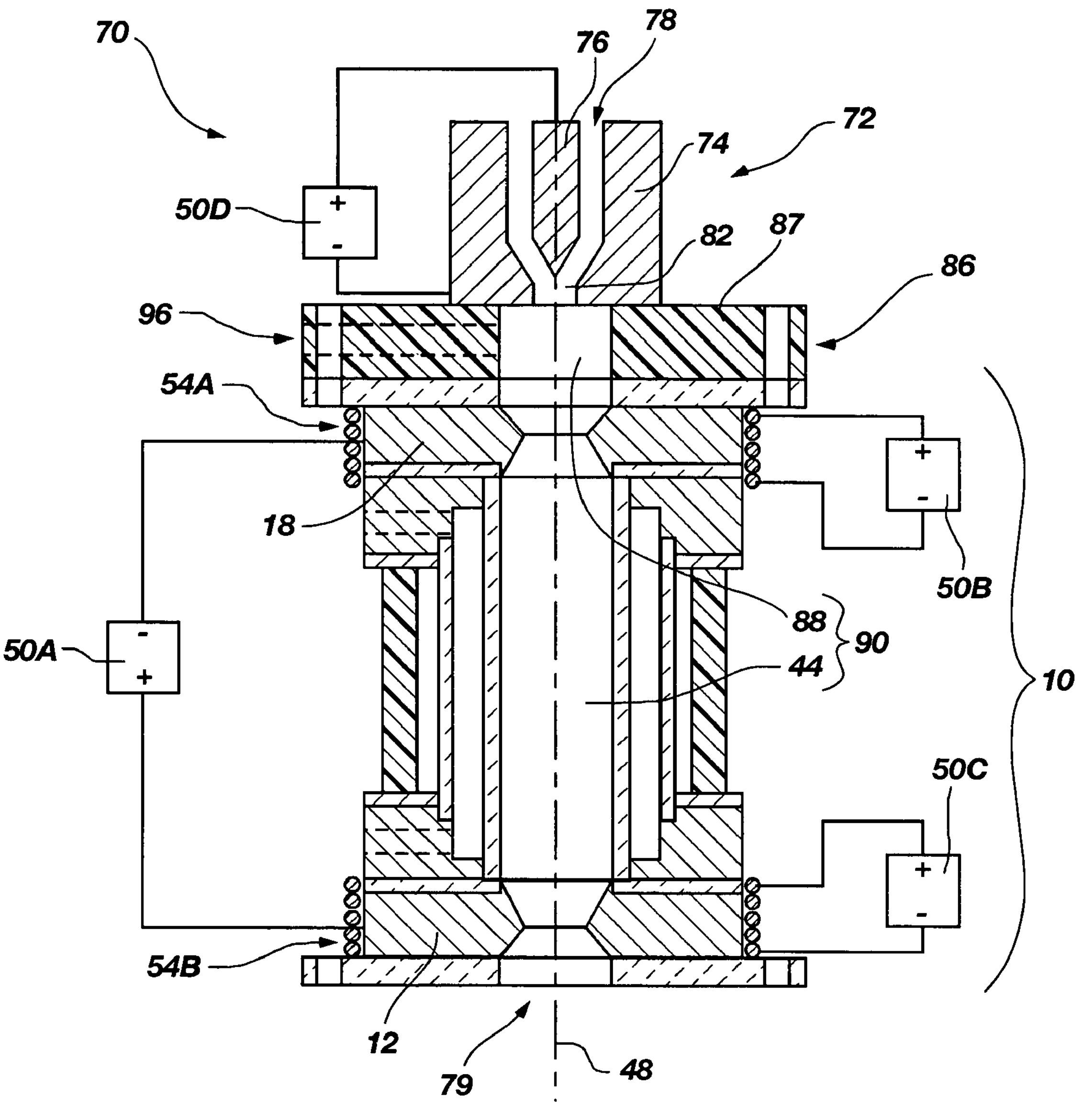
FIG. 3 is a cross-sectional view of a plasma generating apparatus in accordance with an embodiment of the present invention.

For example, referring to FIG. 3, a plasma generating apparatus 70 is shown in accordance with one embodiment of the present invention that includes the module 10 previously described herein in relation to FIG. 1 and which may further include an arc-generating device 72 attached to the module 10. The arc-generating device 72 includes an additional electrode pair comprising an anode 74 and a cathode 76. By way of example and not limitation, the cathode 76 may exhibit a substantially solid, cylindrical shape, and the anode 74 may exhibit a substantially annular shape defining an aperture extending therethrough. The anode 74 may have a generally hollow, cylindrical shape with a generally tapered surface at one end thereof so as to maintain a substantially conformally spaced relationship with the cathode 76. The cathode 76 may be at least partially positioned within the anode 74.

The plasma generating apparatus 70 may include an additional electrical power source 50D that is configured to provide a voltage between the anode 74 and the cathode 76 of the arc-generating device 72. If the magnitude of a voltage applied between the anode 74 and the cathode 76 reaches a critical point, an electrical arc (not shown) extending between the anode 74 and the cathode 76 may be generated. The distance separating the anode 74 and the cathode 76 of the arc-generating device 72 may be significantly less than the distance separating the anode 12 and the cathode 18 of the module 10. Therefore, the magnitude of the voltage required to generate an electrical arc between the anode 74 and the cathode 76 of this arc-generating device 72 may be significantly lower than the magnitude of the voltage required to generate an electrical arc between the anode 12 and the cathode 18 of the module 10. In one embodiment, the arc-generating device 72 may include a commercially available plasma torch.

The electrical arc generated between the anode 74 and the cathode 76 may be referred to as an "ignition arc" in the sense that the electrical arc may be subsequently used to facilitate ignition of an electrical arc extending between the anode 12 and the cathode 18 of the module 10. Matter, such as a plasma gas, may be passed through an inlet 78 which may include the space 82 between the anode 74 and the cathode 76. The ignition arc extending between the anode 74 and the cathode 76 may generate a plasma that includes charged ions and electrons originating from atoms or molecules of the matter passing through the space 82 proximate the ignition arc.

These charged ions and electrons may flow through the bore 44 to regions between the anode 12 and the cathode 18. The presence of the charged ions and electrons between the anode 12 and the cathode 18 may lower the magnitude of the voltage required to generate an electrical arc therebetween, as previously discussed herein.

Once an electrical arc is established between the anode 12 and the cathode 18 of the module 10, the location of the electrical arc within the bore 44 may be selectively manipulate by controlling the current flow through the coils 54A and 54B to generate one or more magnetic fields within the bore 44 as previously discussed. The currents passed through the coils 54A and 54B may be selectively controlled so as to optimize the density of the charged species in the plasma and the distribution of the plasma within a chamber 90 of the plasma generating apparatus 70.

The plasma generating apparatus 70 may also include an inlet structure 86 disposed between the arc-generating device 72 and the module 10 defining an additional material inlet 96 into the chamber 90. The inlet structure 86 may exhibit a substantially annular shape and may include an aperture or bore 88 extending therethrough that defines a space between the arc generating device 72 and the bore 44 of the module 10 and is also in communication with each. The chamber 90 of the plasma generating apparatus 70 is collectively defined by the bore 88 of the structure 86 and the bore 44 of the module 10.

Figure 4:
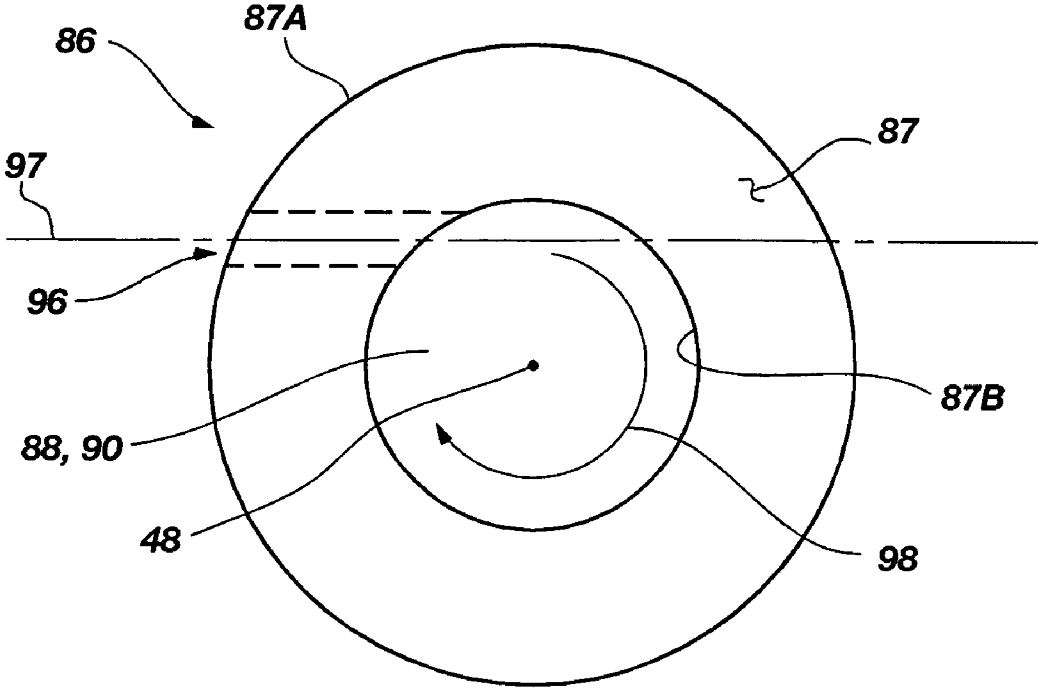
FIG. 4 is a plan view of a component that may be used in a plasma generating apparatus in accordance with an embodiment of the present invention.

The inlet 96 may be formed as a passage through the body of the inlet structure 86 and may be configured to introduce material passing through the inlet 96 into the chamber 90 such that the material exhibits a generally circular or helical flow path within the chamber 90. FIG. 4 is a plan view of an embodiment of an inlet structure 86 in accordance with one embodiment of the present invention. As seen therein, the inlet structure 86 may include a substantially annular shaped disk or body 87. The inlet 96 may include an elongated bore or passage through the body 87 that extends from a radially exterior surface 87A to the radially interior surface 87B that defines bore 88. The elongated bore of the inlet 96 may be centered about a longitudinal axis 97 that does not intersect the longitudinal axis 48 of the module's bore 44 (which, in the presently described embodiment, is also coaxial with the longitudinal axis of the inlet structure's bore 88). As seen in FIG. 4, the inlet 96 may be configured to introduce material passing therethrough into the chamber 90 in an initial direction that is substantially tangential to the radially inner surface 87B that defines the bore 88 of the inlet structure 86. Such a configuration results in a generally circular or swirling flow path of the material introduced into the bore 88 in a clockwise direction within the chamber (when looking through the chamber 90 from the inlet toward the outlet thereof), as indicated by the directional arrow 98. Of course, the inlet 96 may be configured to introduce material into the chamber 90 such that it exhibits a generally counter-clockwise swirling or circular flow path within the chamber 90 if so desired.

Figure 5:
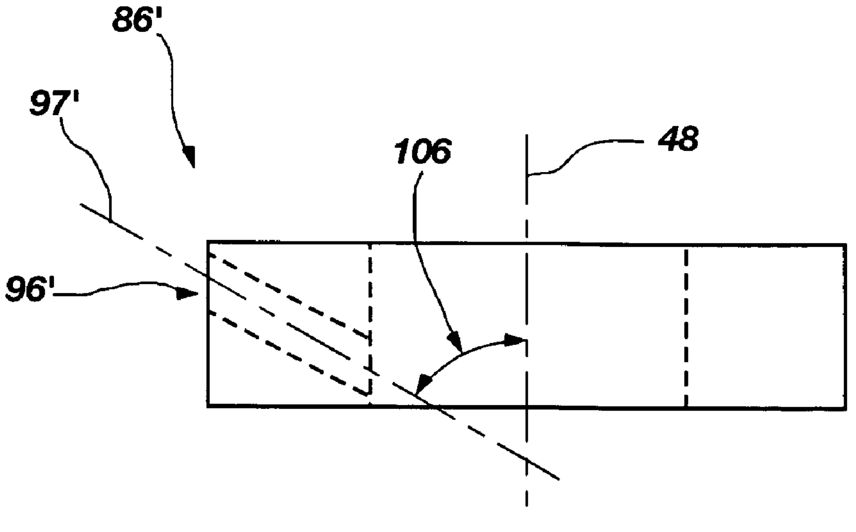
FIG. 5 is a side view of another component that may be used in a plasma generating apparatus in accordance with another embodiment of the present invention.

FIG. 5 illustrates another inlet structure 86' that may be used in the plasma generating apparatus 70 according to another embodiment of the present invention. The inlet structure 86' includes a passage or inlet 96' into the chamber 90 of the plasma generating apparatus 70 and is generally configured similar to the inlet structure 86 described with respect to FIG. 4. However, the inlet structure 86' is additionally configured to induce an initial longitudinal component (i.e., in a direction along the longitudinal axis 48) to the velocity vector of the material. The additional initial longitudinal velocity component results in a generally helical motion of the material as it is initially introduced into the chamber 90. Thus, for example, the longitudinal axis 97' about which the elongated bore of the inlet structure 86' is centered, lies in a plane that is oriented at an angle 106 that is less than 90° relative to the longitudinal axis 48 of the bore 44 or chamber 90. It is noted that used of either inlet structure 86 or 86' results in a generally helical flow path of material introduced thereby and flowing through the chamber 90 of the plasma generating device 70. This is due to the general flow path of material from the inlet structure 86, 86' of the chamber 90 to the outlet of the chamber 90. However, it can be seen that the inlet structures 86 and 86' may be selectively configured to influence the downward or longitudinal component of the velocity vector of any material introduced thereby. Such selective configuration enables further tailoring of the residence time of a given material within the chamber 90 and, therefore, provides substantial flexibility in configuring a plasma generating device for a desired material process.

Referring again to FIG. 3, matter such as, for example, a gas or a liquid may be passed into the chamber 90 and caused to follow a desired flow path (e.g., a generally or substantially circular or helical flow path) by way of the additional inlet or passage 96 of the inlet structure 86. Causing the matter within the chamber 90 to rotate in a generally circular or helical path may cause an electrical arc extending between the anode 12 and the cathode 18 of the module 10 to move in a generally circular path following the path of charged species within the bore 44, even in the absence of any magnetic fields generated by the electrically conductive coils 54A or 54B. In this manner, the inlet 96 may be used to selectively move the location of at least a portion of the electrical arc within the bore 44. Moving the electrical arc within the bore 44 may enhance the density of charged particles within the plasma and enhance the distribution of the plasma within the bore 44. Thus, the density of charged particles within the plasma and the distribution of the plasma within the bore 44 may be optimized by selectively moving the electrical arc within the bore 44 in a manner that provides optimum conditions therein.

Additionally, the passage or inlet 96 of the inlet structure 86 may be configured to swirl matter passing therethrough into the chamber 90 in a generally circular or helical flow path in a first direction about the longitudinal axis 48 of the chamber 90 of the plasma generating apparatus 70, and the coils 54A and 54B may be configured to generate magnetic fields within the chamber 90 that cause at least a portion of the electrical arc to move in a generally circular motion in a second, opposite direction about the longitudinal axis 48 of the chamber 90. For example, an electrical arc extending between an arc endpoint on the cathode 18 and an arc endpoint on the anode 12 may be selectively rotated about the longitudinal axis 48 in a clockwise direction within the chamber 90, while the inlet 96 may be configured to induce a swirling flow path of the matter within the chamber 90 in a counter-clockwise direction within the chamber 90. In such a configuration, turbulent flow of matter within the chamber 90 may be increased, which may enhance the mixing of the molecules, atoms, and ions within the chamber 90.

In another embodiment, the inlet structure 86 and the coils 54A and 54B may be selectively configured such that the flow path of the material flowing through the chamber 90 is the same as (or concurrent with) the motion of the arc about the longitudinal axis 48.

To use the plasma generating apparatus 70 to process or synthesize materials, raw materials may be passed from the inlet 78 of the arc-generating device 72, the inlet 96 of the inlet structure 86, or from both, through the chamber 90 to an outlet 79 of the plasma generating apparatus 70. Other additional materials or chemicals, which may be used as catalysts, oxidizers, reducers or serve as a plasma gas, may also be passed through the chamber 90 from one or both of the inlets 78 to the outlet 79 of the plasma generating apparatus 70. The electrical arc extending between the anode 12 and the cathode 18 may generate a plasma comprising reactive ions from at least one of the raw materials and the other materials or chemicals. The reactive ions may facilitate chemical transformations in the raw materials and chemical reactions between the raw materials and the other additional materials or chemicals. These chemical transformations and reactions may be used to process or synthesize a wide variety of materials or chemicals. In some embodiments, the plasma generating apparatus 70 may be used to conduct either oxidative or reductive chemical reactions in the plasma. In another example, the plasma generating apparatus 70 may be used to produce nanoparticles from larger, solid particles of raw materials.

The structure and configuration of the module 10 enables plasma generating apparatuses to be quickly and easily assembled and configured to process or synthesize particular materials by fastening and arranging a selected number of modules 10 together. For example, a selected number of modules 10 may be secured together in an end-to-end configuration to provide a plasma generating apparatus having desired properties and operating characteristics.

Figure 6:
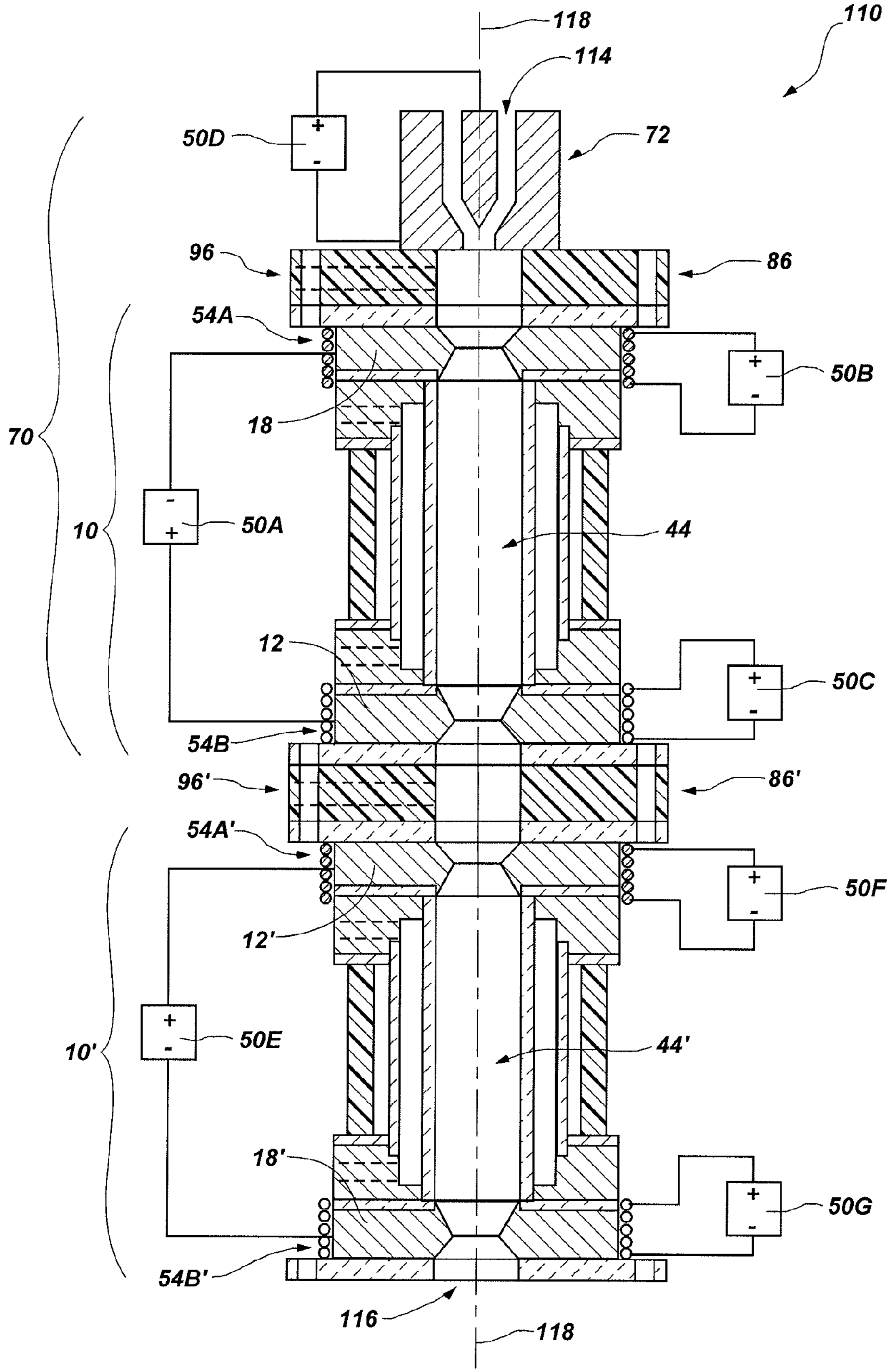
FIG. 6 is a cross-sectional view of another plasma generating apparatus in accordance with another embodiment of the present invention.

Referring to FIG. 6, a plasma generating apparatus 110 according to another embodiment of the present invention is shown. The plasma generating apparatus 110 includes the previously described plasma generating apparatus 70 shown in FIG. 3 and an additional module 10' (referred to as a second module 10' for purposes of clarity) secured thereto. The second module 10' may be substantially identical to the module 10 previously described herein (referred to subsequently herein as a "first module 10" for purposes of clarity), and may include, generally, an anode 12', a cathode 18', and a bore 44'. In this configuration, the plasma generating apparatus 110 includes a chamber comprising at least the bore 44 of the first module 10 and the bore 44' of the second module 10'. The plasma generating apparatus 110 also may include an inlet 114 and an outlet 116 that are each in communication with the chamber. Furthermore, an additional inlet structure 86' including an additional passage or inlet 96' may be provided between the first module 10 and the second module 10'.

An electrical power source 50E may be provided and configured to apply a voltage between the anode 12' and the cathode 18'. As shown in FIG. 6, the polarity of the electrical power source 50E may be oppositely directed relative to the electrical power source 50A that is configured to provide a voltage between the anode 12 and the cathode 18 of the first module 10, effectively switching the position of the anode 12' and the cathode 18' of the second module 10' relative to the first module 10. In another embodiment, the polarity of the power sources 50A and 50E may be the same.

An electrical power source 50F may be provided and configured to pass electrical current through an electrically conductive wire forming a coil 54A' adjacent the anode 12'. Similarly, an electrical power source 50G may be provided and configured to pass electrical current through an electrically conductive wire forming a coil 54B' adjacent the cathode 18'. The electrical power supplies 50F and 50G may be configured such that current flows in the same direction through the coil 54A' of the second module 10' and the coil 54A of the first module 10, and such that current flows in the same direction through the coil 54B' of the second module 10' and the coil 54B of the first module 10. In such a configuration, an electrical arc extending through the bore 44' between an arc endpoint on the anode 12' and an arc endpoint on the cathode 18' of the module 10' may be selectively moved, due to the magnetic fields imposed by the coils 54A' and 54B', in a circular motion about a longitudinal axis 118 of the chamber in a direction that is opposite to the direction of motion of an electrical arc extending through the bore 44 between an arc endpoint on the anode 12 and an arc endpoint on the cathode 18 of the first module 10.

In other words, at least a portion of an electrical arc within the first module 10 may be moved in a first circular direction about the longitudinal axis 118 within the chamber of the plasma generating apparatus 110, while at least a portion of an electrical arc within the second module 10' may be moved in a second, opposite circular direction about the axis 118 within the chamber of the plasma generating apparatus 110. It is noted that the same resulting motion of electrical arcs within the plasma generating apparatus 110 may be achieved by configuring the polarity of the electrical power source 50E to be the same as the polarity of the electrical power source 50A, while configuring the polarity of the electrical power source 50F to be opposite to the polarity of the electrical power source 50B, and also configuring the polarity of the electrical power source 50G to be opposite to the polarity of the electrical power source 50C.

In another embodiment, at least a portion of an electrical arc within the first module 10 may be induced to move in a circular direction about an axis within the chamber of the plasma generating apparatus 110, and at least a portion of an electrical arc within the second module 10' may be induced to moved in the same circular direction about the axis 118 within the chamber of the plasma generating apparatus 110. Such may be accomplished by configuring the polarity of the electrical power source 50E to be the same as the polarity of the electrical power source 50A, configuring the polarity of the electrical power source 50F to be the same as the polarity of the electrical power source 50B, and configuring the polarity of the electrical power source 50G to be the same as the polarity of the electrical power source 50C. The same resulting motion of electrical arcs within the plasma generating apparatus 110 (i.e., both being induced to move in the same circular direction) may be achieved by configuring the polarity of the electrical power source 50E to be opposite the polarity of the electrical power source 50A, configuring the polarity of the electrical power source 50F to be opposite the polarity of the electrical power source 50B, and configuring the polarity of the electrical power source 50G to be opposite the polarity of the electrical power source 50C.

As previously described herein, the passage or inlet 96 of the inlet structure 86 may be configured to introduce matter passing through the inlet 96 into the bore 44 such that it swirls either a clockwise or a counter-clockwise direction within the chamber (when looking through the chamber from the inlet 114 toward the outlet 116). Similarly, the passage or inlet 96' of the second inlet structure 86' may be configured to introduce matter passing through the inlet 96 into the bore 44' such that it swirls in either a clockwise or a counter-clockwise direction within the chamber. Moreover, the additional inlet 96 of the structure 86 and the additional inlet 96' of the structure 86' may be selectively configured to swirl matter passing through the inlets 96, 96' in either the same (concurrent) direction about the axis 118 within the chamber or in opposite (countercurrent) directions about the axis 118 within the chamber.

It is noted, therefore, that the plasma generating apparatus 110 shown and described with respect to FIG. 6 can be operated in at least sixteen different configurations or modes since the inlet structures 86 and 86' can each be independently configured to swirl matter in either the clockwise or the counter-clockwise direction, the first module 10 can be configured to move at least a portion of its electrical arc in either the clockwise or the counter-clockwise direction, and the second module 10' can be configured to move at least a portion of its electrical arc in either the clockwise or the counter-clockwise direction about the longitudinal axis 118. As can be recognized, plasma generating apparatuses that embody teachings of the present invention may be operated in at least $2^N$ different configurations or modes, where N is equal to the total number of modules and inlet structures that are configured to induce a swirling motion of the matter flowing through the chamber of the apparatus.

Individual modules of a plasma generating apparatus may be additionally selectively configured. For example, the power supplied by the electrical power source 50E to the anode 12' and the cathode 18' of the module 10' may be less than, equal to, or greater than the power supplied by the electrical power source 50A to the anode 12 and the cathode 18 of the first module 10. For example, the power supplied to the electrode pairs of each module may increase in the direction extending from the inlet 114 to the outlet 116 of the plasma generating apparatus 110. In another embodiment, the power supplied to the electrode pairs of each module may decrease in the direction extending from the inlet 114 to the outlet 116 of the plasma generating apparatus 110. In yet another embodiment, the power being supplied to each module may be substantially consistent.

The plasma generating apparatuses and devices described herein may be used to process or synthesize materials. Modular plasma generating devices that embody teachings of the present invention allow for plasma generating apparatuses and systems to be quickly and easily customized for processing or synthesizing particular materials. Furthermore, plasma generating apparatuses embodying teachings of the present invention as described herein may be used to provide large heating zones and resulting plasmas that are characterized by enhanced uniformity of temperature. Furthermore, an unlimited number of modular plasma generating devices may be assembled to provide plasma generating apparatuses of virtually unlimited lengths, thereby providing long residence times for materials within the chamber. The use of multiple modules in a plasma generating device enables residence times of materials within plasma to be more accurately controlled, which ultimately leads to greater stability and predictability in material reactions of a given process.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A plasma reactor apparatus comprising:

an enclosed reaction chamber having an inlet and an outlet;

a first electrode pair comprising an anode and a cathode, the first electrode pair being configured to provide a first electrical arc proximate the inlet of the chamber;

a second electrode pair comprising an annular anode and an annular cathode, the second electrode pair configured to provide a second electrical arc within the chamber, the second electrical arc extending between an arc endpoint on the annular cathode of the second electrode pair and an arc endpoint on the annular anode of the second electrode pair; and at least one electrically insulating elongated tube having an inner surface at least partially defining the enclosed reaction chamber, the annular anode of the second electrode pair disposed at a first end of the at least one electrically insulating elongated tube and the annular cathode of the second electrode pair disposed at an opposing second end of the at least one electrically insulating elongated tube, the annular anode and the annular cathode of the second electrode pair each having a respective opening extending therethrough, the openings extending respectively through the annular anode and the annular cathode of the second electrode pair having average cross-sectional areas less than an average cross-sectional area of a portion of the enclosed reaction chamber defined by the inner surface of the at least one electrically insulating elongated tube between the annular anode and the annular cathode of the second electrode pair.

2. The plasma reactor device of claim 1, wherein the arc end point on the annular anode of the second electrode pair includes an edge defined by an intersection between a first surface and a second surface of the annular anode of the second electrode pair, and wherein the arc end point on the annular cathode of the second electrode pair includes an edge defined by an intersection between a first surface and a second surface of the annular cathode of the second electrode pair.

3. The plasma reactor apparatus of claim 1, further comprising a device configured to selectively move circumferentially a location of at least a portion of the second electrical arc within the chamber relative to a longitudinal axis of the chamber.

4. The plasma reactor apparatus of claim 3, wherein the device configured to selectively move circumferentially the location of at least a portion of the second electrical arc within the chamber comprises a device located and configured to induce movement of charged species generated by the first electrical arc in a circular flow path within the chamber.

5. The plasma reactor apparatus of claim 3, wherein the device configured to selectively move circumferentially the location of at least a portion of the second electrical arc within the chamber comprises at least one device configured to generate a magnetic field in a region within the chamber proximate at least one of the annular anode and the annular cathode of the second electrode pair.

6. The plasma reactor apparatus of claim 5, wherein the at least one device configured to generate a magnetic field comprises:

an electrically conductive wire wound in a coil; and a current source configured to pass electrical current through the electrically conductive wire.

7. The plasma reactor apparatus of claim 6, wherein the coil surrounds at least a portion of the chamber.

8. The plasma reactor apparatus of claim 7, wherein the coil surrounds at least a portion of the chamber proximate at least one of the annular anode and the annular cathode of the second electrode pair.

9. The plasma reactor apparatus of claim 5, wherein the at least one device is configured to generate the magnetic field to substantially continuously move circumferentially the location of the arc endpoint on at least one of the annular anode and the annular cathode of the second electrode pair in a first circular direction about the longitudinal axis of the chamber.

10. The plasma reactor apparatus of claim 9, wherein the openings extending respectively through each of the annular anode and the annular cathode of the second electrode pair are substantially circular openings, and wherein the arc endpoint on the annular anode of the second electrode pair is located on a surface of the annular anode of the second electrode pair in the substantially circular opening extending through the annular anode of the second electrode pair and wherein the arc endpoint on the annular cathode of the second electrode pair is located on a surface of the annular cathode of the second electrode pair in the substantially circular opening extending through the annular cathode of the second electrode pair.

11. The plasma reactor apparatus of claim 10, wherein the substantially circular opening extending through the annular anode of the second electrode pair and the substantially circular opening extending through the annular cathode of the second electrode pair are each substantially centered about the longitudinal axis of the chamber.

12. The plasma reactor apparatus of claim 9, wherein the chamber defines a substantially cylindrically shaped volume.

13. The plasma reactor apparatus of claim 12, wherein the chamber further comprises an additional inlet disposed between the first pair of electrodes and the second pair of electrodes, the additional inlet being configured to induce a generally helical flow path of matter passing through the chamber.

14. The plasma reactor apparatus of claim 13, wherein the generally helical flow path of the matter is in a second circular direction about the longitudinal axis of the chamber, and wherein the second circular direction is substantially opposite of the first circular direction.

15. A plasma reactor apparatus comprising:

a plurality of interconnected modules cooperatively defining a chamber, each module of the plurality of interconnected modules comprising:

at least one electrically insulating elongated tube defining a portion of the chamber;

at least one device configured to generate an electrical arc within the at least one electrically insulating elongated tube at least one device configured to generate an electrical arc comprising an annular anode and an annular cathode each having a respective opening extending therethrough, the openings extending respectively through the annular anode and the annular cathode having average cross-sectional areas less than an average cross-sectional area of a portion of the chamber defined by an inner surface of the at least one electrically insulated elongated tube between the annular anode and the annular cathode;

at least one device configured to generate a magnetic field within the at least one electrically insulating elongated tube, the magnetic field being configured to selectively displace at least a portion of the electrical arc within the at least one electrically insulating elongated tube; and at least two electrodes configured to provide an additional electrical arc proximate the inlet of the chamber, the at least two electrodes comprising:

a first electrode having a substantially cylindrical portion; and a second electrode having an aperture extending therethrough, an end of the first electrode positioned proximate the aperture of the second electrode so as to define a space between the first electrode and the second electrode, wherein the space between the first electrode and the second electrode is in communication with the inlet of the chamber.

16. The plasma reactor apparatus of claim 15, wherein the at least one device configured to generate an electrical arc within the at least one electrically insulating elongated tube comprises an electrode pair comprising an anode and a cathode, the electrode pair being located and configured such that the electrical arc extends through the at least one electrically insulating elongated tube between an arc endpoint on the cathode and an arc endpoint on the anode.

17. The plasma reactor apparatus of claim 16, further comprising at least one power source coupled to the anode and cathode of at least one electrode pair and configured to apply a voltage therebetween.

18. The plasma reactor apparatus of claim 17, wherein the device configured to generate a magnetic field comprises:

at least one electrically conductive wire wound in a coil; and a current source configured to pass electrical current through the at least one electrically conductive wire.

19. The plasma reactor apparatus of claim 18, wherein the coil surrounds a portion of the chamber.

20. The plasma reactor apparatus of claim 16, wherein each module of the plurality of interconnected modules includes a substantially cylindrical body portion, the plurality of interconnected modules being interconnected in an end-to-end configuration to form the chamber and define a substantially cylindrical volume within the chamber, the chamber further comprising an inlet proximate a first end of the elongated chamber and an outlet proximate a second end of the elongated chamber.

21. The plasma reactor apparatus of claim 20, wherein each anode includes a body having a substantially circular opening defined therein and each cathode includes a body portion having a substantially circular opening defined therein.

22. The plasma reactor apparatus of claim 21, wherein the substantially circular opening of each anode and the substantially circular opening of each cathode are each substantially centered about a longitudinal axis of the chamber.

23. The plasma reactor apparatus of claim 22, wherein the coil of each module is located and configured to induce the magnetic field within the chamber so as to continuously move a circumferential location of at least a portion of the electrical arc in the module associated with the coil in a generally circular motion about the longitudinal axis of the chamber.

24. The plasma reactor apparatus of claim 22, wherein at least one module and its associated coil are configured to move at least a portion of an electrical arc to be generated therein in a first circular direction about the longitudinal axis of the chamber and wherein at least one other module and its associated coil are configured to move at least a portion of another electrical arc to be generated therein in a second circular direction about the longitudinal axis of the chamber, the first circular direction being opposite of the second circular direction.

25. The plasma reactor apparatus of claim 24, wherein each module further comprises a respective additional inlet, the additional inlet being located, oriented and configured to introduce matter passing therethrough into the chamber such that the matter exhibits a substantially circular flow path about the longitudinal axis of the chamber.

26. A method of generating a plasma comprising:

flowing matter through a first opening extending through a first annular electrode, into an enclosed reaction chamber at least partially defined by an inner surface of at least one electrically insulating elongated tube, and out from the enclosed reaction chamber through a second opening extending through a second annular electrode, the first annular electrode comprising one of an annular anode and an annular cathode and the second annular electrode comprising the other of the annular anode and the annular cathode;

providing the second opening of the second annular electrode with an average cross-sectional area less than an average cross-sectional area of a portion of the enclosed reaction chamber defined by the inner surface of the at least one electrically insulating elongated tube between the first annular electrode and the second annular electrode;

generating a voltage between the annular anode and the annular cathode to establish an electrical arc extending through the at least one electrically insulating elongated tube between an arc endpoint on the annular anode and an arc endpoint on the annular cathode;

generating at least one magnetic field in at least one region within the at least one electrically insulating elongated tube; and controlling the at least one magnetic field to selectively move circumferentially a location of at least one of the arc endpoint on the annular anode and the arc endpoint on the annular cathode about a longitudinal axis of the at least one electrically insulating elongated tube.

27. The method of claim 26, further comprising generating a plasma using an ignition arc and directing the plasma into the at least one electrically insulating elongated tube.

28. The method of claim 27, further comprising forming the opening extending through the annular anode to be substantially circular and forming the opening extending through the annular cathode to be substantially circular.

29. The method of claim 28, wherein controlling the first magnetic field to selectively move circumferentially a location of at least one of the arc endpoint on the annular anode and the arc endpoint on the annular cathode further comprises controlling the magnetic field to selectively move circumferentially the location of the arc endpoint on the annular anode in an at least substantially circular direction about an inner periphery of the substantially circular opening of the annular anode and to selectively move the arc endpoint on the annular cathode in an at least substantially circular direction about an inner periphery of the substantially circular opening of the annular cathode.

30. The method of claim 28, further comprising:

forming the substantially circular opening of the annular anode to comprise a first edge defined by an intersection between two surfaces of the annular anode, the arc endpoint on the annular anode being disposed on the first edge; and forming the substantially circular opening of the annular cathode to comprise a second edge defined by an intersection between two surfaces of the annular cathode, the arc endpoint on the annular cathode being disposed on the second edge.

31. The method of claim 28, wherein generating at least one magnetic field comprises:

winding an electrically conductive wire in a coil;

positioning the coil proximate at least one of the annular anode and the annular cathode; and generating current in the electrically conductive wire.

32. The method of claim 31, wherein winding the electrically conductive wire in a coil further comprises winding the electrically conductive wire around at least a portion of the at least one electrically insulating elongated tube.

33. The method of claim 26, further comprising providing an inlet leading to an interior region of the at least one electrically insulating elongated tube and an outlet leading out from the interior region of the at least one electrically insulating elongated tube.

34. The method of claim 33, further comprising introducing matter into the interior region of the at least one electrically insulating elongated tube through the inlet.

35. The method of claim 34, wherein introducing matter into the interior region of the at least one electrically insulating elongated tube comprises urging the matter to follow a flow path in the interior region in a first circular direction about the longitudinal axis of the at least one electrically insulating elongated tube.

36. The method of claim 35, wherein controlling the at least one magnetic field to selectively move circumferentially a location of at least one of the arc endpoint on the annular anode and the arc endpoint on the annular cathode further comprises controlling the at least one magnetic field to selectively move circumferentially the location of at least one of the arc endpoint on the annular anode and the arc endpoint on the annular cathode in a generally circular motion about the longitudinal axis of the at least one electrically insulating elongated tube in a second direction that is opposite to the first direction.

37. A method of generating a plasma comprising:

interconnecting a plurality of modules each comprising an electrically insulating elongated tube disposed between two annular electrodes of an electrode pair to form a chamber having an inlet and an outlet;

providing an opening extending through each annular electrode of the two annular electrodes of the electrode pair of at least one module with an average cross-sectional area less than an average cross-sectional area of a portion of the chamber defined by an inner surface of the electrically insulating elongated tube of the at least one module between the two annular electrodes of the electrode pair;

forming at least two ignition electrodes to comprise a first electrode having a substantially cylindrical portion and a second electrode having an aperture extending therethrough, and positioning an end of the first electrode proximate the aperture of the second electrode so as to define a space between the first electrode and the second electrode in communication with the inlet of the chamber;

generating a voltage between the at least two ignition electrodes to generate an electrical arc proximate the inlet of the chamber;

generating a voltage between an anode and a cathode of the electrode pair of each module to establish an electrical arc extending through the electrically insulating elongated tube between an arc endpoint on a surface of the cathode and an arc endpoint on a surface of the anode of each respective module of the plurality of modules; and selectively controlling a magnetic field within each module of the plurality of modules to selectively move circumferentially a location of at least one of the arc endpoint on the surface of the cathode and the arc endpoint on the surface of the anode of each respective module of the plurality of modules.

38. The method of claim 37, wherein generating a voltage between the anode and the cathode of the electrode pair of each module comprises generating a first voltage between the anode and the cathode of the electrode pair of a first module, and generating a second voltage between the anode and the cathode of the electrode pair of a second module, the first voltage differing in magnitude from the second voltage.

39. The method of claim 37, wherein generating a voltage between the anode and the cathode of the electrode pair of each module comprises generating a unique voltage between the cathode and the anode of each electrode pair.

40. The method of claim 39, wherein generating a unique voltage between the cathode and the anode of the electrode pair of each module comprises generating a first voltage between the cathode and the anode of the electrode pair of a module of the plurality of modules located closest to the inlet to the chamber and generating a relative lower second voltage between the cathode and the anode of the electrode pair of a module of the plurality of modules located closest to the outlet from the chamber.

* * * * *

UNITED STATES PATENT AND TRADEMARK OFFICE

CERTIFICATE OF CORRECTION

PATENT NO. : 7,741,577 B2
APPLICATION NO. : 11/392141
DATED : June 22, 2010
INVENTOR(S) : Peter C. Kong, Jon D. Grandy and Brent A. Detering It is certified that error appears in the above-identified patent and that said Letters Patent is hereby corrected as shown below:

In the drawings:

In FIG. 1, Reference numeral --39-- should be applied to the fluid passageways indicated in horizontal dashed lines extending to the left from annular space 35.

Signed and Sealed this
Twentieth Day of November, 2012

David J. Kappos

David J. Kappos
*Director of the United States Patent and Trademark Office*